(12) United States Patent
Hall

(10) Patent No.: US 6,336,802 B1
(45) Date of Patent: Jan. 8, 2002

(54) REDUCED MASS UNITARY FRAME FOR ULTRA HIGH-PRESSURE HIGH-TEMPERATURE PRESS APPARATUS

(76) Inventor: David R. Hall, 2185 S. Larsen Pkwy, Provo, UT (US) 84606

( * ) Notice: Subject to any disclaimer, the term of this patent is extended or adjusted under 35 U.S.C. 154(b) by 0 days.

(21) Appl. No.: 09/703,983

(22) Filed: Oct. 27, 2000

Related U.S. Application Data

(60) Continuation-in-part of application No. 09/482,065, filed on Jan. 13, 2000, which is a division of application No. 09/037,507, filed on Mar. 10, 1998, now abandoned.

(51) Int. Cl.[7] .............................. B29C 43/02; B30B 7/00
(52) U.S. Cl. ........................................ 425/77; 425/330
(58) Field of Search ................................... 425/77, 330

(56) References Cited

U.S. PATENT DOCUMENTS

| | | | | |
|---|---|---|---|---|
| 3,093,862 A | * | 6/1963 | Gerard et al. .................. | 425/77 |
| 3,255,490 A | * | 6/1966 | Strum .......................... | 425/77 |
| 3,257,688 A | * | 6/1966 | Levey, Jr. ..................... | 425/77 |

* cited by examiner

*Primary Examiner*—James P. Mackey

(57) ABSTRACT

A reduced mass unitary frame having a cubic, spherical, prismatic, or ellipsoidal shape, a plurality of intersecting threaded boreholes that describe an spherical internal reaction chamber, and a plurality of unitary cartridges with internal fluid intensification for an ultra-high pressure, high-temperature, fluid driven press apparatus capable of reaching pressures in excess of 35 kilobars and temperatures above 1000 degrees centigrade, useful in the production of such high-pressure products as diamond, polycrystalline diamond, cubic boron nitride, and like superhard materials.

3 Claims, 12 Drawing Sheets

REDUCED MASS UNITARY FRAME FOR ULTRA HIGH-PRESSURE HIGH-TEMPERATURE PRESS APPARATUS

CROSS-REFERENCES TO RELATED APPLICATIONS

This is a continuation-in-part of application Ser. No. 09/482,065, filed Jan. 13, 2000, which is a division of application Ser. No. 09/037,507, filed Mar. 10, 1998, now abandoned.

BACKGROUND OF THE INVENTION

This invention relates to a unitary frame and fluid driven unitary cartridges useful in an ultra high-pressure, high-temperature, press apparatus. More particularly, this invention relates to a reduced mass, multi-axis, ultra-high pressure, high temperature, hydraulically actuated, press apparatus capable of reaching pressures in excess of 35 kilobars and temperatures above 1000 degrees centigrade. Such a press is useful in the production and sintering of superhard materials such as cemented ceramics, diamond, polycrystalline diamond, cubic boron nitride, and exotic metallodial gases such as metallic hydrogen.

Figure 14:
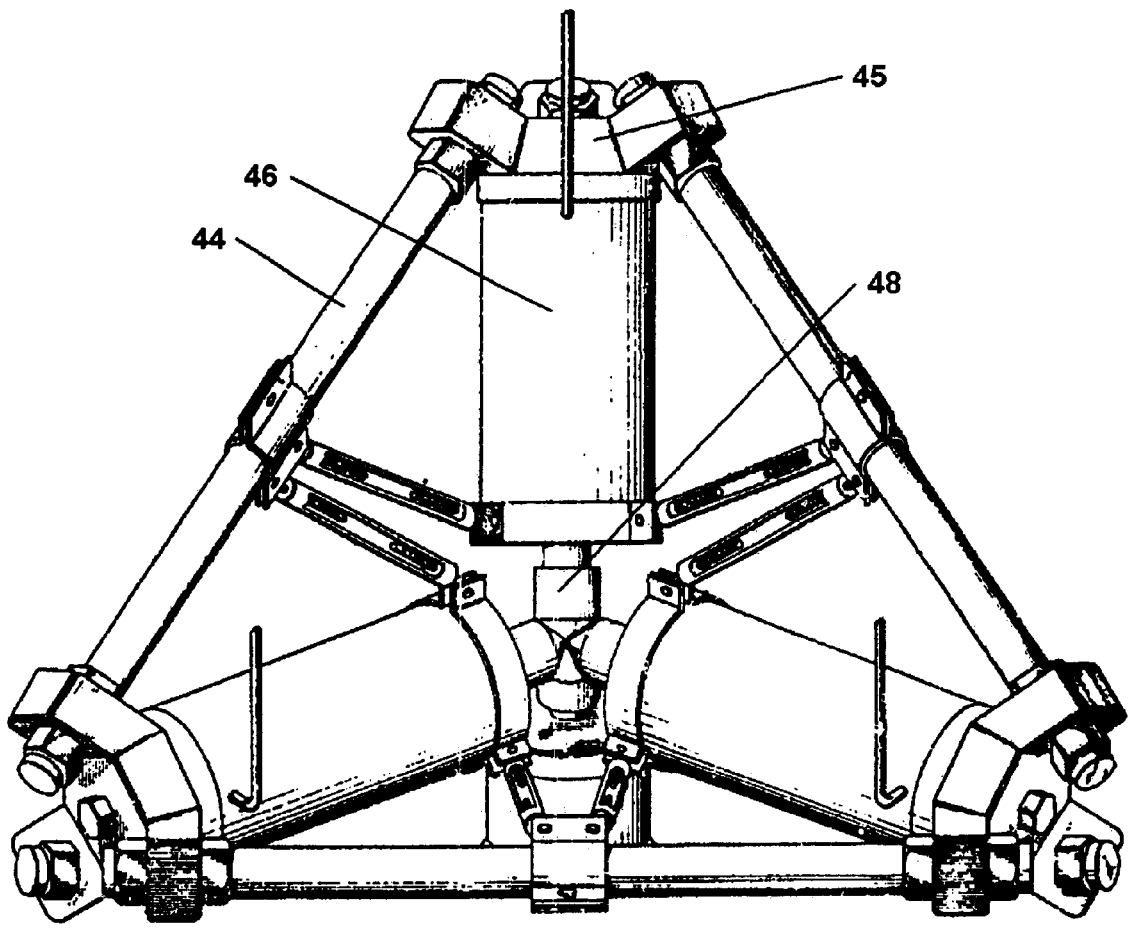

Multi-axis, ultra high-pressure, high-temperature, presses have been known in the art for the production and sintering of superhard materials for more than three decades. They may be classified by the tonnage of pressure, or "thrust," they are capable of exerting on the reaction cell. For example, a 2000-ton multi-axis press is capable of producing approximately 700,000 p.s.i on each face of a cubic reaction cell, which is a force sufficient to produce a superhard payload such as diamond, polycrystalline diamond, or cubic boron nitride. FIG. 14 depicts a conventional multi-axis press that was patented by Dr. H. Tracy Hall, the inventor of reproducible man-made diamond. See U.S. Pat. Nos. 2,918,699 and 3,913,280. Basically, there are five components in this press design: the tie-bar frame (44), the massive bases (45) supporting he tie-bar frame, the piston cylinders (46), the guide pins (47), and the anvils (48). Because the bending moments of the tie bar press are so great, its mass becomes enormous as the size of the press is increased. For example, the weight of a 3000-ton tie bar style steel press may exceed 60 tons, in order to withstand the reaction forces produced by the hydraulic pistons. The weight of a 4000-ton tie bar steel press is known to exceed 100 tons. Because the bending moments are so great, the bases of a 4000-ton tie bar press experience occasional fatigue failures.

Since man-made diamond was first produced in a G.E. laboratory by Dr. Hall, circa 1953, the commercial production, and sintering of diamond and other superhard materials has become a multi-billion dollar industry worldwide. Modern production of superhard materials continues to increase at a growth rate of 15 percent, or more, annually. But despite the success of the superhard industry, given their unique properties, diamond and other superhard materials have barely scratched the surface of their potential commercial applications. In order for superhard materials to reach their full commercial potential, more economical and more efficient multi-axis presses must be designed and constructed to satisfy the ever increasing demand for these modern miracle materials.

Typically, the manufacturing or sintering process for superhard materials in a multi-axis press consists of placing a superhard payload inside a high-pressure, high-temperature, reaction cell known in the art The reaction cell, made up of a pressure-transferring medium also known in the art, is placed within the press's high-pressure chamber and subjected to an ultra-high compressive force. During the press cycle, the pressure inside the cell must reach 35 kilobars, or more. Simultaneously, an electrical current is passed through the cell's resistance heating mechanism, also known in the art, raising the temperature inside the cell to above 1000° C. Once the superhard payload is subjected to sufficient pressure and temperature for a prescribed period of time, the current is terminated and the cell cooled. Pressure on the cell is then released, the anvils retracted, and the cell with its superhard payload removed from the press. The four aspects, then, of the multi-axis press cycle are: 1) to exert sufficient force on the cell, creating internal pressures above 35 kilobars, 2) to raise the temperature inside the cell to above 1000° C., 3) to cool the cell quickly; and 4) to release the force on the cell and retrieve the payload from the press.

The cost of construction of a multi-axis press is proportional to its mass and while its efficiency is proportional to the duration of its cycle and volume of its payload. Therefore, the smaller the mass of the press, and the shorter the duration of the pressing cycle, and the larger the cell, permitting a larger volume of payload, the higher the economy and efficiency of the multi-axis press. These parameters presented significant engineering and design challenges to the inventor herein in reaching his objective of producing or sintering superhand materials more efficiency and more economically in a multi-axis press.

The inventor's first objective in making the prress more efficient was to come up with a more compact press frame design. His aim was a press with less mass: one that would not exhibit the bending moments of the tie-bar frame, which limited the size of the press and its payload capacity.

intuitively for the design, the inventior settled upon a unique single-piece frame, which eliminated the tie bars, centralized the frame's mass, and permitted the use of internally intensified, unitary, piston cylindres. Surprisingly, he discovered that by using this unitary frame and cylinder design, he was able to achieve a significant reduction in the overall size and weight of the press. This made the press more economical to build and reduced the cost of payload produced per ton of press.

Next, by using an innovative internal intensifier piston within a unitary cylinder, the inventor discovered that he could reduce even more the overall size and cost of the press. In the conventional tie-bar press system, the length and diameter of the piston cylinders are proportional to the overall size of the press, and the hydraulic fluid must be pumped to the press at pressures around 10,000 p.s.i., or more, which requires specially made high-pressure pumps, hoses, and fittings. In the press of the present invention, on the other hand, the length and diameter of the piston cylinders are not proportional to the size of the press, resulting in a more compact overall design. And since fluid pressure amplification occurs inside the piston cylinder, the high pressure at which fluid needs to be pumped to the press may be reduced by up to one half, eliminating the need for the specially made high-pressure pumps, hoses, and fittings.

In designing the unitary cartridge with internal intensification, the inventor relied upon a hydraulic model based upon a standard hydraulic fluid used in the conventional tie-bar press's piston cylinder. In attempting to operate his new press, however, the inventor was surprised to discover that the standard hydraulic fluid used in the conventional press was not stiff enough for his new design, and the internal intensifier piston bottomed out without applying sufficient force on the cell. To overcome this obstacle, the inventor selected a water glycol based energy transmitting fluid, having a bulk modulus greater than 370,000 psi, such as that manufactured by Union Carbide, U.S. Pat. No. 4,855,070. To his surprise, in the press cartridge this fluid seemed to exhibit properties of stiffness greater than its constituent compounds as reported by its manufacturer, which resulted in an intensifier piston stroke even shorter than anticipated.

The inventor also discovered that because of the fluid's high stiffness, it stored less energy. This is significant because during the pressing cycle, the fluid is compressed within the cartridge and stores spring like energy. In the event of a catastrophic loss of pressure during the pressing cycle, known in the art as a "blow out," this stored energy suddenly escapes creating tremendous torsional loads on the press components. Such loads are so great that they can actually tender the press inoperable. Therefore, the less stored energy in the fluid, the less likely damage will result to the press from a blowout.

An additional objective of the inventor in was to increase the volume of the reaction cell's payload. This he was able to achieve in the new unitary press design by use of a rectangular prismatic cell. Since the cartridges of the present invention are capable of functioning independently of each other, they are then capable of exerting differential forces on the sides of the cell while producing the uniform internal pressure required in the manufacturing process. This permits the use of a prismatic reaction cell. By utilizing a prismatically configured high-pressure chamber and rectangular reaction cell, the volume of the payload may be increased three fold. This increased volume translates into higher production rates and less cost per unit of product, hence greater efficiency and economy in the manufacturing process.

SUMMARY OF THE INVENTION

In the art, superhard materials are manufactured by assembling the product to be produced inside a reaction cell, by placing the reaction cell in the high-pressure chamber of a high-pressure press, and by simultaneously compressing the cell to ultra high pressure while passing an electrical current through the cell's resistance heater mechanism, which raises the temperature inside the cell to above 1000° C. It is the object of this invention to utilize known reaction cell technology in an innovative press in order to produce superhard materials economically and efficiently. This will be achieved in the present invention by utilizing an innovative reduced mass unitary press frame, requiring a mass of less than 12 tons of steel for a 3000-ton press, and unitary cartridge bodies having an internal fluid pressure intensifier requiring less than 5000 p.s.i. external pump pressure. A 3000-ton steel press of the present invention weighs less than 30 tons compared to a conventional tie-bar style steel press weighing in excess of 60 tons. Similar or greater mass reductions are achievable as the press size is increased. For example, an 8000-ton steel press can be produced weighing less than 50 tons.

BRIEF DESCRIPTIONS OF DRAWINGS

Figure 1:
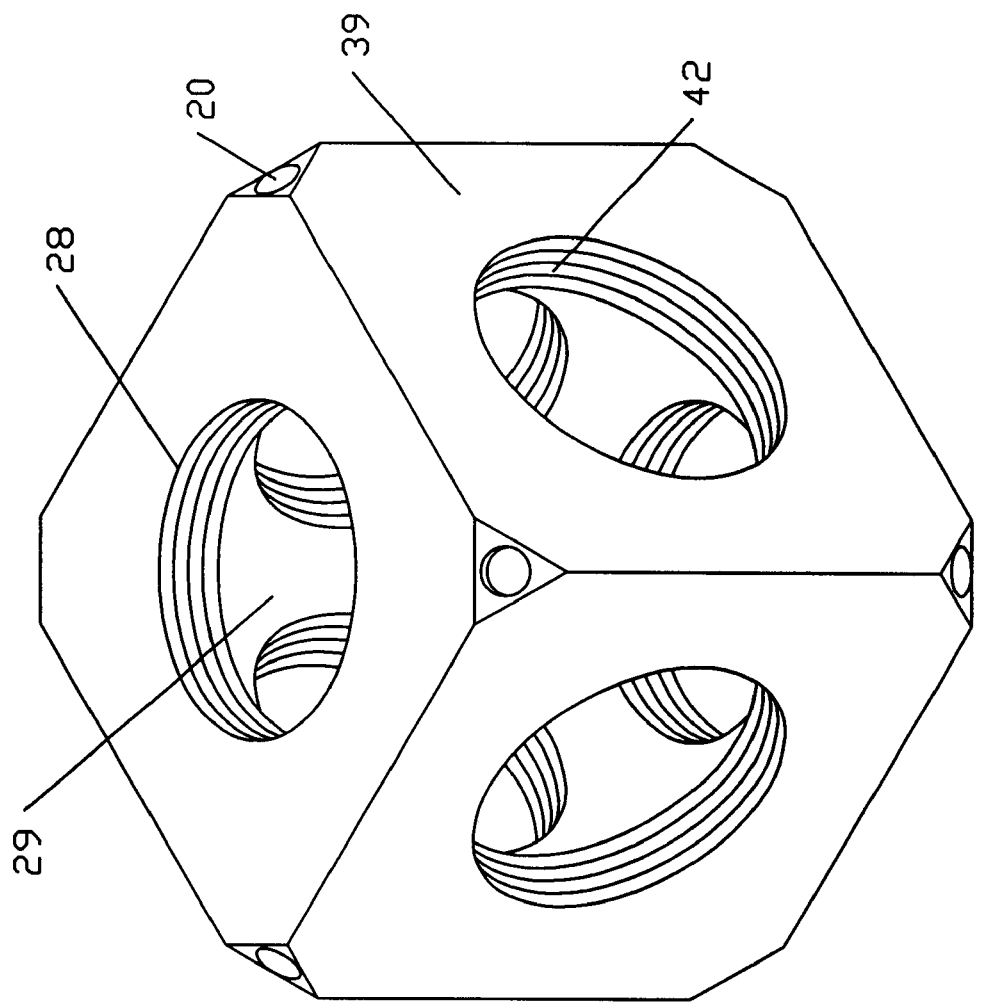

FIG. 1. An isometric view of a unitary cubic frame, a preferred embodiment of the press apparatus of the present invention.

Figure 2:
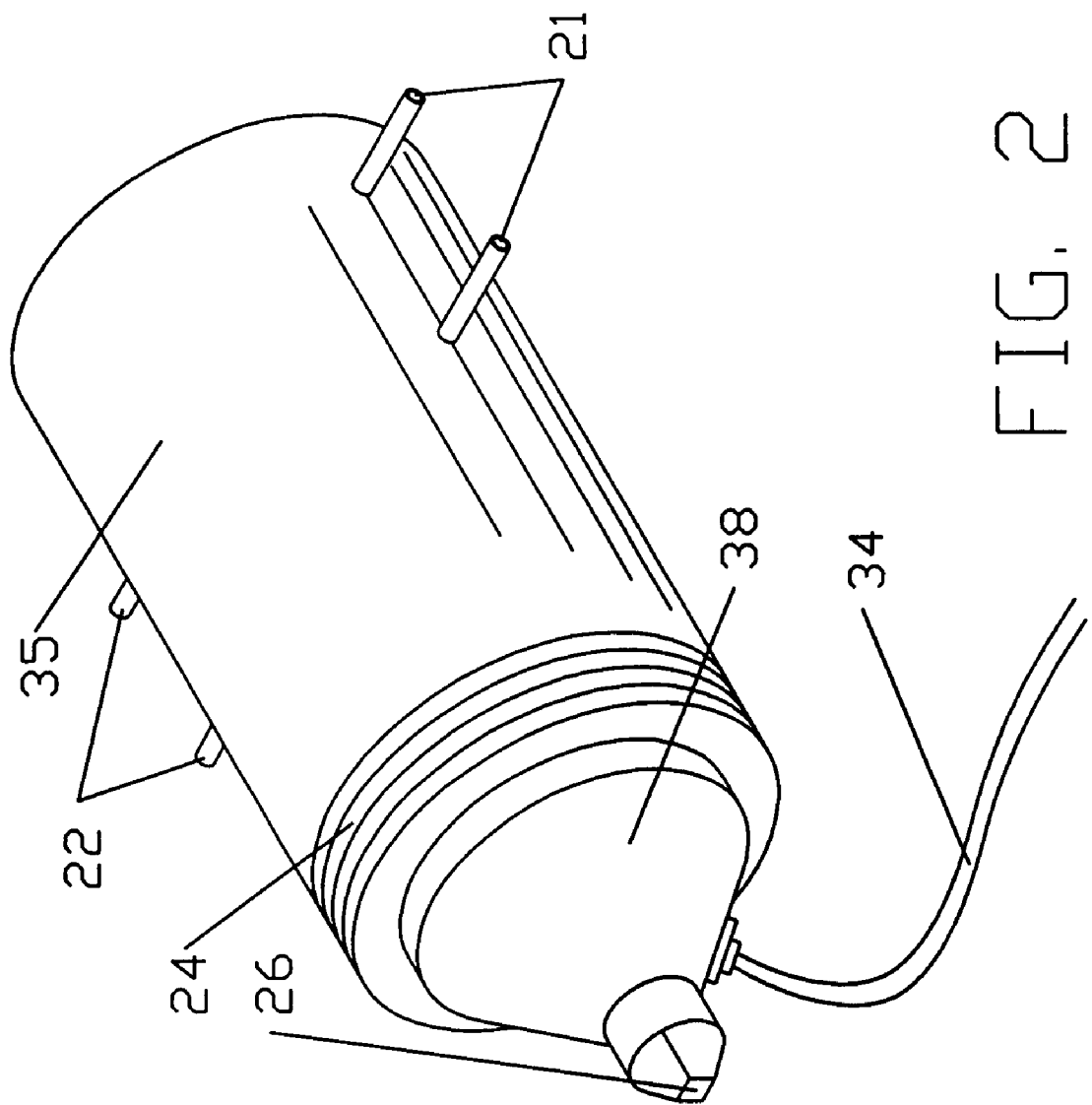

FIG. 2. An isometric view of a preferred embodiment of the unitary cartridge of the press apparatus of the present invention.

Figure 3:
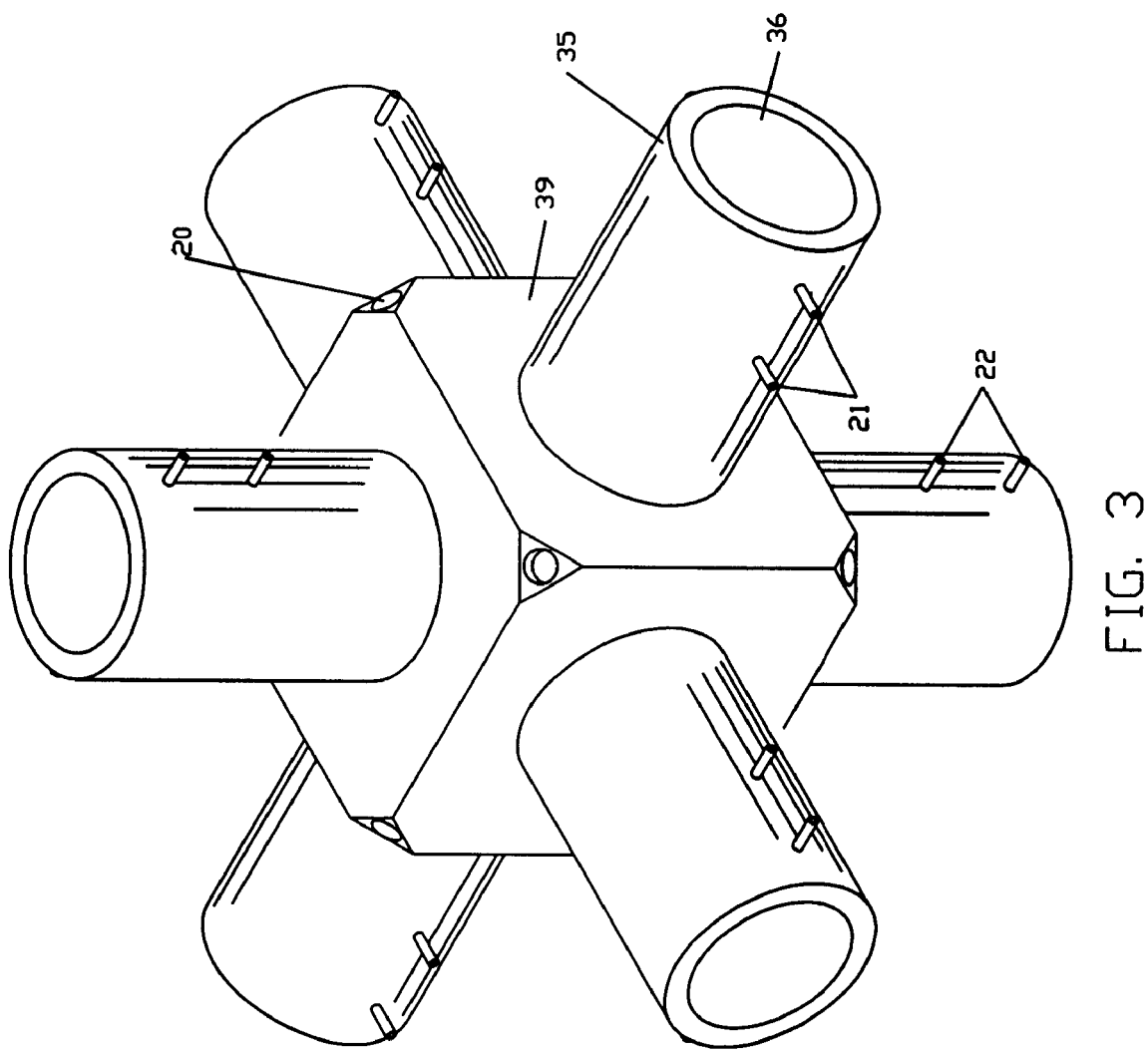

FIG. 3. An isometric view of a preferred embodiment assembled press apparatus of the present invention.

Figure 4:
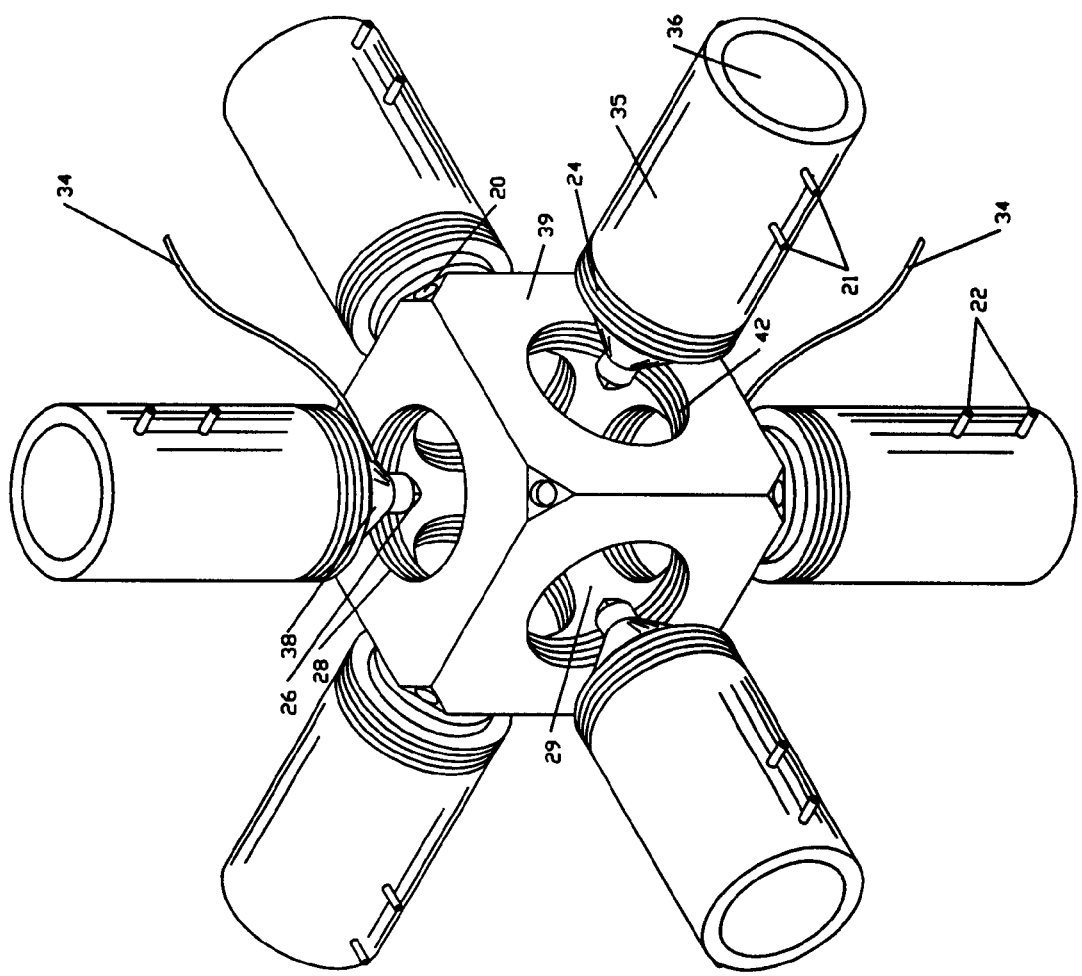

FIG. 4. An exploded view of a preferred embodiment press apparatus of the present invention.

Figure 5:
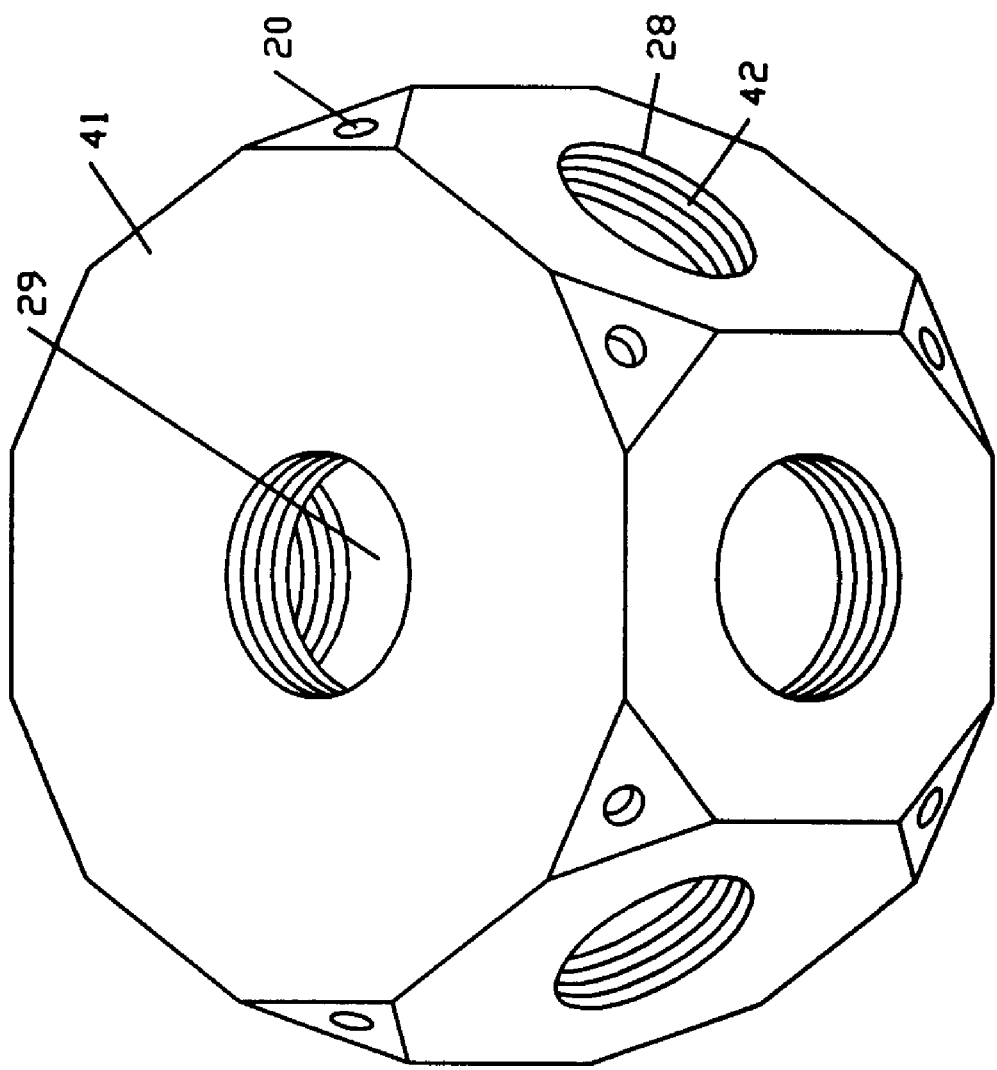

FIG. 5. An isometric view of a preferred embodiment unitary prismatic frame of the press apparatus of the present invention.

Figure 6:
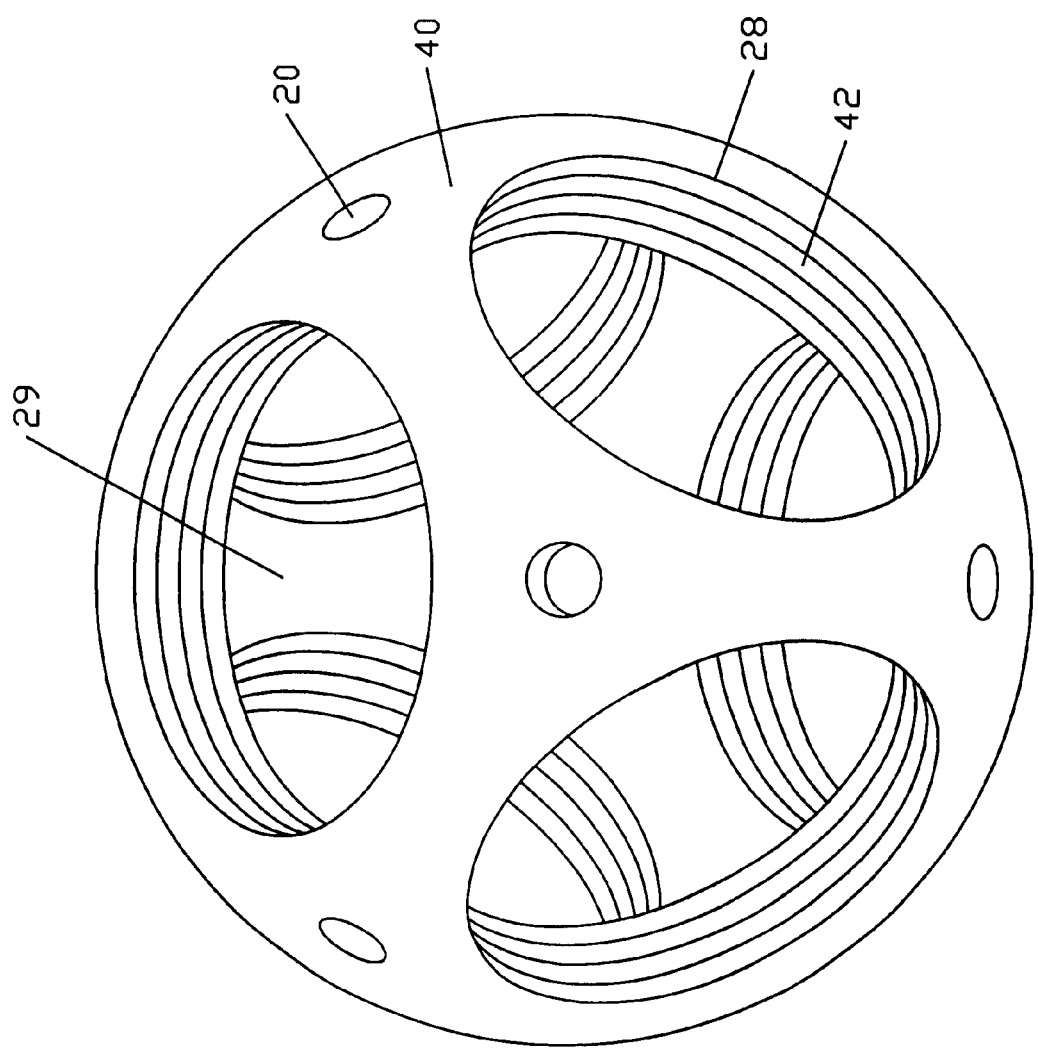

FIG. 6. An isometric view of a preferred embodiment spherical frame of the press apparatus of the present invention.

Figure 7:
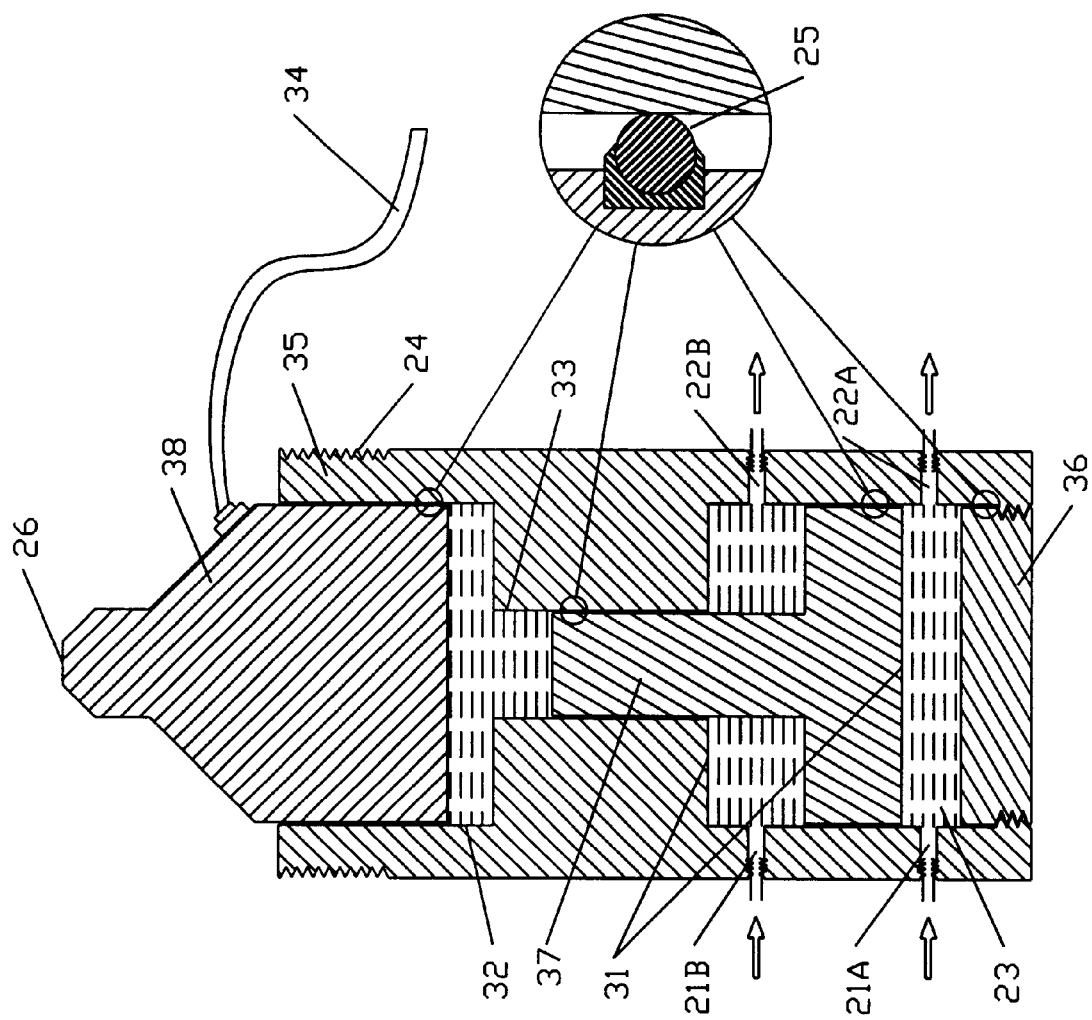

FIG. 7. A longitudinally sectioned view of a preferred embodiment unitary cartridge of the press apparatus of the present invention.

Figure 8:
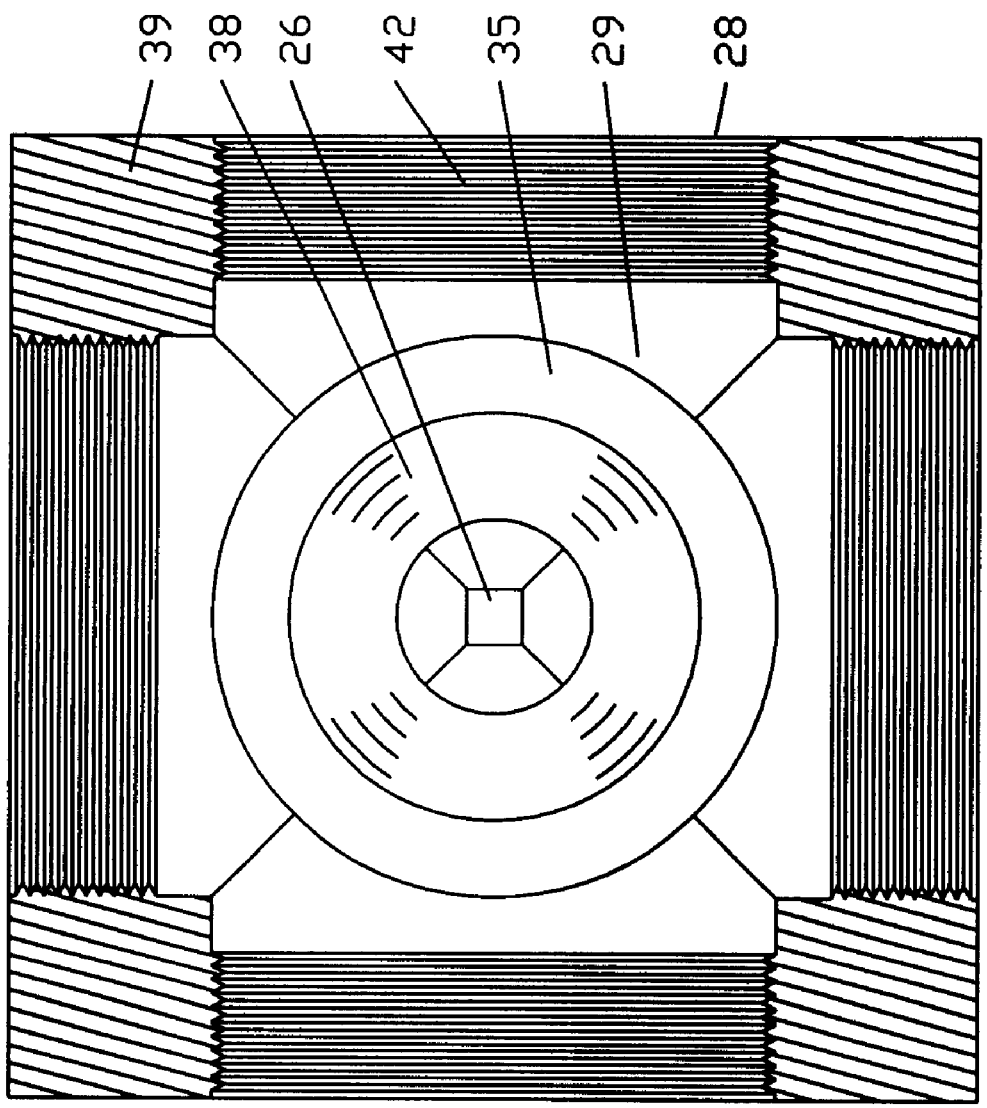

FIG. 8. A vertically sectioned view of a preferred embodiment unitary cubic frame of the press apparatus of the present invention, also depicting a perspective view of the working end of the cartridge.

Figure 9:
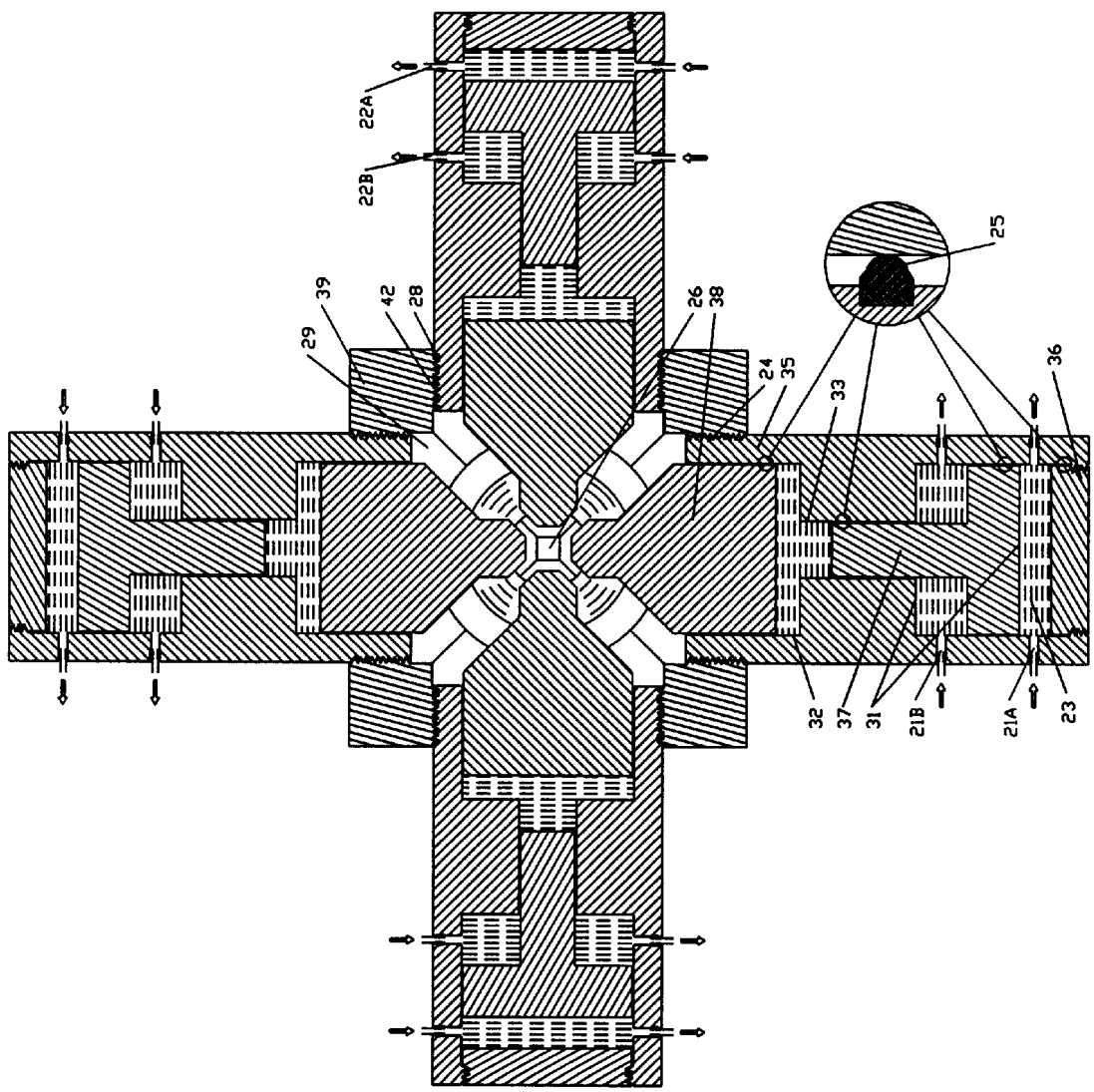

FIG. 9. A vertically sectioned view of a preferred embodiment of the press apparatus of the present invention.

Figure 10:
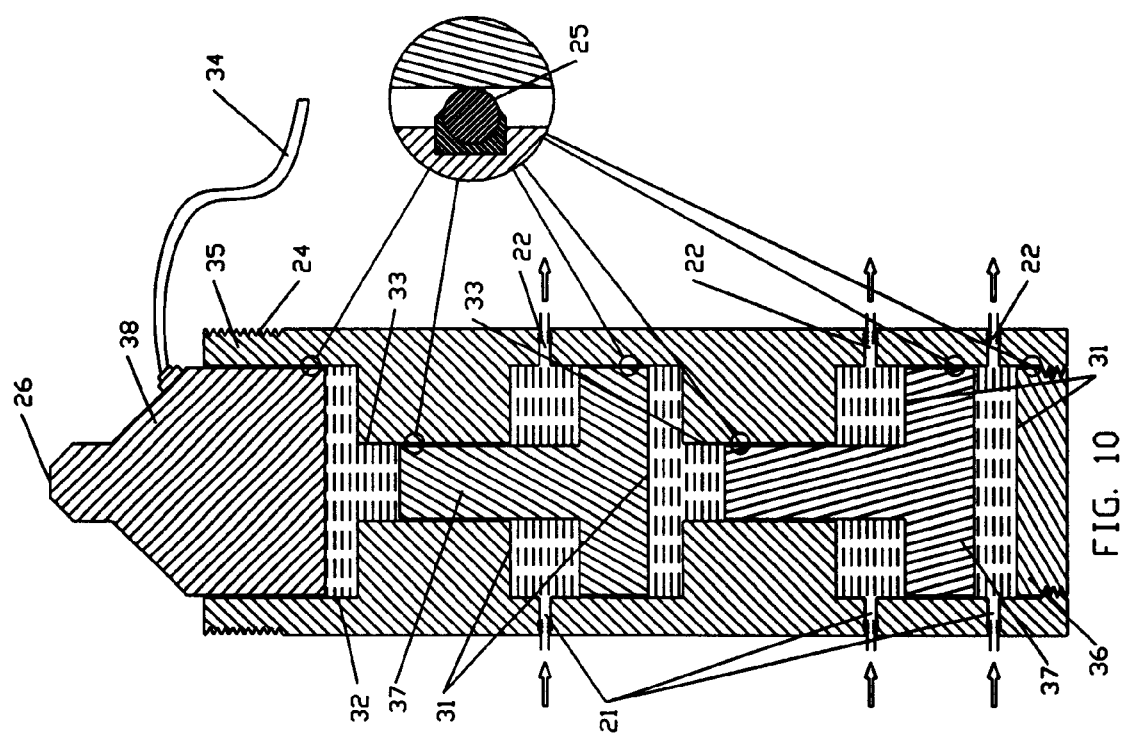

FIG. 10. A longitudinally sectioned view of a preferred embodiment cartridge of the press apparatus of the present invention comprising a plurality of internal fluid intensifier pistons.

Figure 11:
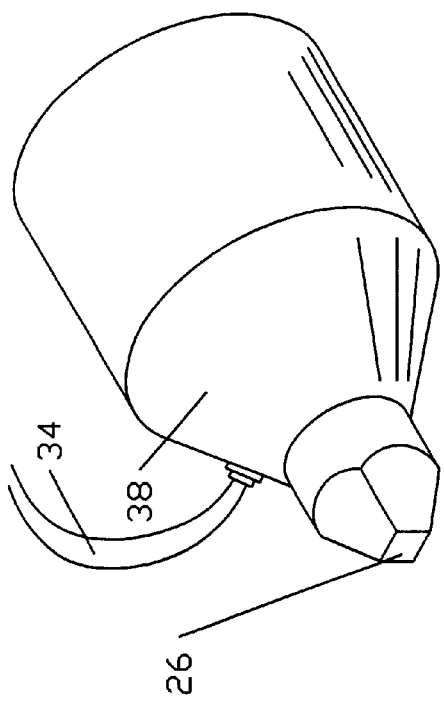

FIG. 11. A perspective view of a preferred embodiment of the anvil/piston of the press apparatus of the present invention comprising a square anvil face for use in a cubic press.

Figure 12:
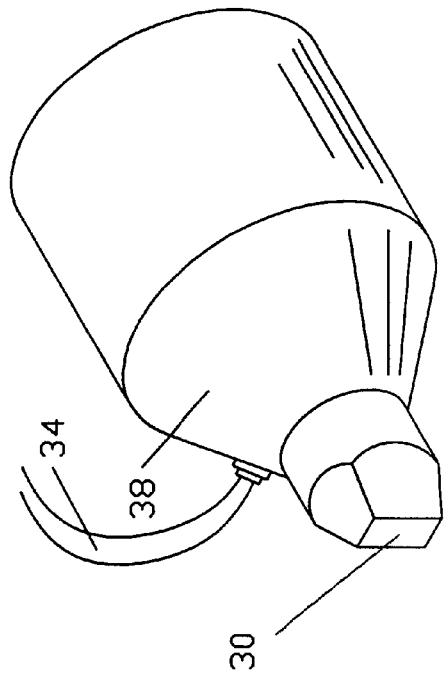

FIG. 12. A perspective view of a preferred embodiment of the anvil/piston of the press apparatus of the present invention comprising a rectangular anvil face for use in a prismatic press.

Figure 13:
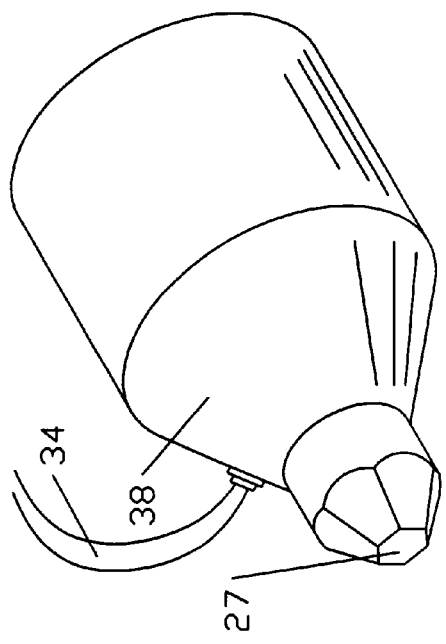

FIG. 13. A perspective view of a preferred embodiment of the anvil/piston of the press apparatus of the present invention comprising a polygonal anvil face for use in a prismatic cubic press.

FIG. 14. A perspective view of a conventional tie-bar frame press.

DETAILED DESCRIPTION

The present invention will be more fully described in reference to the embodiments depicted in FIGS. 1 through 14.

FIG. 1. The unitary cubic frame (39) of the press of the present invention is shown in perspective. The frame may be constructed of high strength steel such as AISI 4340 steel, or equivalent, polymer fibers such as Dupont's Kevlar, or graphite fiber composites, or a combination thereof, capable of withstanding the high tensile stresses of normal press operation above 35 kilobars. The frame (39) comprises intersecting boreholes (28) with means of attachment to the cartridges (35), depicted in FIG. 2. In this preferred embodiment, axial threads (42) along the inside diameter wall of boreholes (28) comprise the means of attachment Although not depicted, other means of attachment may comprise taper, friction, breech, and or bolts. At least one port (20) is provided to allow access to the inside of the frame once the press is completely assembled. The cavity (29) resulting from the intersection of the bore holes (28) forms a sphere and contains the high-pressure chamber of the working press. The substantially spherical configuration of the interior of the frame reduces the stresses of the reaction forces produced during press operation allowing for a more compact frame design of reduced mass.

FIG. 2. The unitary cartridge (35) with internal intensification is depicted in perspective. The cartridge (35) comprises a unitary cylindrical body with means of attachment. In this embodiment, threads (24) comprise the means of attachment to the press frame. Although not depicted, other means of attachment may include taper, friction, breech, and or bolts. An anvil/piston (38) protrudes from the working end of the cartridge. A conductor means (34) of passing an electrical current through the anvil/piston (26) is provided. Pressurized fluid is admitted into the cartridge (35) through inlets (21) and exhausted through outlets (22). In normal operation, the anvil/piston reciprocates rectilinearly. The synchronized advance of the anvil/pistons (38) toward the center of the press cavity (29) encloses and defines the high-pressure chamber of the press. When attached to the unitary frame (FIGS. 1, 5, and 6) the cartridge becomes an integral member of the press of the present invention.

Referring to FIGS. 3 and 4, the assembled cubic press is depicted in isometric and exploded views comprising the cubic frame (39) with the six unitary cartridges (35) threaded into the boreholes (28). The press is provided with at least one port (20) to allow access to the press cavity (29) for loading and unloading and visual inspection of the reaction cell when the press is fully assembled. In normal press operation, a reaction cell known in the art is placed inside the spherical cavity (29). The anvil/pistons (38) are hydraulically urged forward, the anvil faces (26) describing the high-pressure chamber and contacting the cell, forming high-pressure gaskets also known in the art, and compressing the cell with forces in excess of 35 kilobars. While the reaction cell is being subjected to ultra high pressure, a means (34), known in the art, is provided for passing an electrical current through the anvil/piston (38) and the reaction cell's resistance heating mechanism, also known in the art, raising the temperature of the product inside the cell to more than 1000 degrees centigrade.

The frame of the present invention may comprise other preferred geometric embodiments such as a prism, a sphere, or an ellipsoid. Although not depicted in this application, those knowledgeable in the art will recognize additional configurations not described herein, but, nevertheless, predicated by this application.

Referring to FIG. 5., The unitary prismatic frame of the present invention (41) is depicted in perspective comprising bore holes (28) with axial threads (42), and access ports (20). The frame may be constructed of hardened steel such as AISI 4340 steel, or equivalent, polymer fibers such as Dupont's Kevlar, or graphite fiber composites, or a combination thereof, capable of withstanding the high tensile stresses of normal press operation above 35 kilobars. The frame (41) comprises intersecting boreholes (28) with means of attachment to the cartridges (35), depicted in FIG. 2. In this embodiment, axial threads (42) along the inside diameter of the boreholes comprise the means of attachment. Although not depicted, other means of attachment may comprise taper, friction, breech, and or bolts. Ports (20) are provided to allow access to the inside the frame for visual inspection and loading and unloading the reaction cell, once the press is completely assembled. The cavity (29) resulting from the intersection of the bore holes (28) forms a sphere and contains the high-pressure chamber of the working press. The spherical configuration of the interior of the press frame reduces the stresses associated with the reaction forces developed during press operation permitting a more compact design of reduced mass. Although not shown in this preferred embodiment, a plurality of unitary cartridges may be attached to the prismatic frame (41) in a fashion similar to the cubic frame (39) depicted at FIG. 1.

Referring to FIG. 6., an isometric view of a spherical frame (40) of the present invention is depicted. Like the cubic and prismatic frames, the unitary spherical frame of the present invention (40) comprises boreholes (28) with threads (42), and access ports (20). The frame may be constructed of hardened steel such as AISI 4340 steel, or equivalent, polymer fibers such as Dupont's Kevlar, or graphite fibers, or a combination thereof, capable of withstanding the high tensile stresses of normal press operation above 35 kilobars. The frame (40) comprises intersecting boreholes (28) with means of attachment to the cartridges (35), depicted in FIG. 2. In this embodiment, axial threads (42) along the inside diameter wall comprise the means of attachment. Although not depicted, other means of attachment may comprise taper, friction, breech, and or bolts. Ports (20) are provided to allow access to the inside of the frame for visual inspection and loading and unloading the reaction cell, once the press is completely assembled. The cavity (29) resulting from the intersection of the bore holes (28) forms a spherical configuration and contains the high-pressure chamber of the working press. The spherical configuration of the interior of the frame reduces the stresses that necessarily build up in the frame during press operation, permitting a frame having reduced mass. Although not shown in this preferred embodiment, a plurality of unitary cartridges may be attached to the spherical frame (40) in a fashion similar to the cubic frame (39) depicted at FIG. 1.

FIG. 7 depicts a longitudinal cross section of a unitary cartridge body with internal intensification. The cartridge body (35) comprises a first pressure chamber (31), a second high-pressure chamber (32), and a connecting cylindrical passageway (33). The cartridge further comprises a pressurized fluid having a bulk modulus greater than 370,000 psi (23), pressure fluid inlets (21A and 21B), and pressure fluid outlets (22A and 22B), and a means of attachment (24), such as threads, taper, breech, and or bolts. Installed inside the first high pressure chamber (31) of the cartridge body (35) are a plug (36) and the internal fluid intensifier piston (37), the plunger of which is inserted into the cylindrical passageway (33). The anvil/piston (38) is inserted into the second high-pressure chamber (32) in such a manner that it protrudes from the attachment end of the cartridge body. This is the working end of the cartridge and is attached to the borehole of the frame. The anvil/piston (38), the intensifier piston (37), and the plug (36) further comprise a seal means (25).

In normal operation of the press cycle, the pressurized fluid (23) from an external pumping source, not shown, is admitted into the first pressure chamber (31) via the inlet (21A), forcing the internal fluid intensifier piston (37) forward. The forward motion of the piston (37) acts upon the fluid in the second high-pressure chamber (32) and urges the anvil/piston (38) forward. As the anvil/piston (38) comes in contact with a typical reaction cell known in the art, not shown, the fluid pressure from the external pumping source is increased in the first chamber (31) causing amplified fluid pressure to build in the second chamber (32), behind the anvil/piston (38). The anvil/piston (38) then acts as a mechanical intensifier of the pressurized fluid working on it, generating ultra high pressure at the anvil face (26). In the preferred embodiment press frames (FIGS. 1, 5, and 6), as the anvil faces (26) approach one another, (See FIG. 9), they describe a polyhedron which encloses the sides of the reaction cell, which forms the press's high-pressure chamber. A means (34) of passing an electrical current through the anvil/piston (38) is provided. As the reaction cell is compressed by the anvils/pistons (38) working in concert, an electrical connection, known in the art, is achieved between the anvil face (26) and the reaction cell's resistance heating mechanism causing the temperature inside the cell to rise above 1000 degrees centigrade.

At the end of the press cycle, the pressurized fluid (23) acting on the intensifier piston (37) is evacuated through the outlet (22A). Additional pressurized fluid is then admitted into the pressure chamber 31 via inlet (21B) forcing the piston (37) to retract. As the piston (37) retracts, a vacuum is created in the high-pressure chamber (32) behind the anvil/piston (38) causing it to retract also. At the start of the press cycle, the fluid in front of the intensifier piston is evacuated via outlet (22B).

Referring to FIG. 8, a vertical cross section of the unitary frame (39) is depicted, comprising a preferred embodiment frame (39), intersecting through bore holes (28), threads (42) as a means of attachment, and a cavity (29) having a substantially spherical configuration for stress relief. A view of the working end of the cartridge (35) is also shown, comprising the anvil/piston (38) and the anvil face (26). Not shown are other preferred embodiments of the attachment means such as taper, breech, friction, and or bolts.

Referring to FIG. 9, a longitudinal cross section of a preferred embodiment cubic frame press of the present invention is depicted comprising a cubic frame (39), with a plurality of unitary cartridge bodies (35) attached. The unitary frame further comprises through boreholes (28), a means of attachment (42), and a substantially spherical cavity (29) formed by the intersection of the through bore holes (28). Although the preferred embodiment prismatic frame press (FIG. 5) and the preferred embodiment spherical frame press (FIG. 6) are not shown in cross section, a plurality of unitary cartridges may be attached to them in a fashion similar to that depicted herein. The unitary cartridge bodies (35) further comprise a first pressure chamber (31), a second high-pressure chamber (32), a cylindrical passageway (33), and a plug (36), installed in the end of the first pressure chamber (31). The cartridges further comprise the internal fluid intensifier pistons (37) installed inside the first pressure chambers (31), with their plungers in the cylindrical passageways (33). The cartridges further comprise the anvil/piston (38) installed in and protruding from the second high-pressure chamber (32), pressurized fluid (23), a seal means (25), a means of attachment (24), a plurality of fluid inlets (21A and 21B), and a plurality of fluid outlets (22A and 22B).

Referring to FIG. 10. A cross section of a preferred embodiment unitary cartridge body is depicted having a plurality of internal intensifier pistons. The cartridge comprises a plurality of high-pressure chambers (31), a plurality of passageways (33), a plurality of internal fluid intensifier pistons (37), a plurality of fluid inlets (21A and 21B), a plurality of fluid outlets (22A and 22B), and such other features as described in FIGS. 7 and 9.

Referring to FIGS. 11, 12, and 13. The anvil/pistons (38) comprise a means of electrical connection (34). FIG. 11 comprises an anvil/piston with a face (26) describing a plane square. FIG. 12 comprises an anvil/piston with a face (30) describing a plane rectangle. And FIG. 13 comprises an anvil/piston with a face (27) describing a plane polygon. Typically, anvils are composed of materials having the highest compressive strengths such as cemented metal carbides. The anvil faces enclose the sides of the reaction cell and form the press's high-pressure chamber.

What is claimed:

1. A unitary frame for use in a high-pressure and high-temperature press apparatus, comprising:
    a. a unitary frame comprising materials selected from the group consisting of high-strength steel, polymer fibers, or graphite fiber composites, or a combination thereof, capable of withstanding reaction forces in excess of 35 kilobars;
    b. the unitary frame further comprising a cubic, prismatic, spherical, or ellipsoidal shape;
    c. the unitary frame further comprising four or more intersecting axial boreholes which define a substantially spherical high-pressure chamber within the frame;
    d. the unitary frame further comprising at least one port that permits access to the high-pressure chamber; and
    e. the boreholes comprising axial threads along the inside diameter wall as a means for attachment to fluid driven cartridges that when attached to the frame complete the press apparatus.

2. The unitary frame of claim 1 weighing less than 12 tons for a 3000-ton press apparatus.

3. The unitary frame of claim 1 weighing less than 50 tons for an 8000-ton press apparatus.

* * * * *